Figure 1:
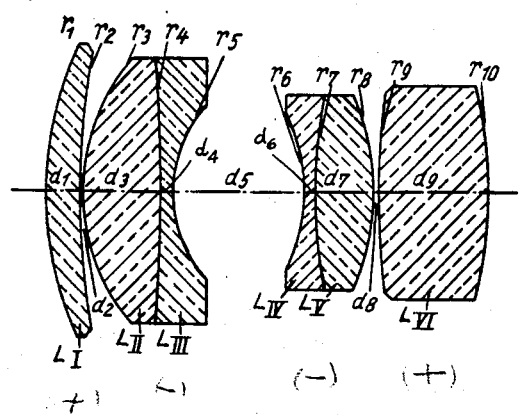

Aug. 4, 1959    J. BERGER ET AL    2,897,723
PHOTOGRAPHIC OBJECTIVE FOR TAKING OR PROJECTION
Filed March 23, 1956

United States Patent Office 2,897,723
Patented Aug. 4, 1959

2,897,723

PHOTOGRAPHIC OBJECTIVE FOR TAKING OR PROJECTION

Johannes Berger, Heidenheim (Brenz), and Guenther Lange, Konigsbronn, Germany, assignors to Carl Zeiss, Heidenheim (Brenz), Wurttemberg, Germany Application March 23, 1956, Serial No. 573,367
Claims priority, application Germany April 7, 1955
9 Claims. (Cl. 88—57)

The present invention concerns photographic objectives which are used preferentially for projection; it is however self-evident that one may use them also for photographic exposure with the ray-path inverted.

Object of the invention is an improvement of such objectives which contain six lenses of which the first and the second are collective lenses, the third and the fourth are dispersive lenses and the fifth and the sixth are collective lenses again, wherein all surfaces whose radius of curvature is numerically smaller than 90% of the focal length turn their concave sides towards the air space found between the third and the fourth lenses.

In order to obtain a good compromise between the aberrations influencing the quality of definition in the sense specifically to keep all of them as small as possible the following conditions should be simultaneously fulfilled in objectives of the design mentioned above according to the invention:

$$1.25 \cdot \bar{r}_s < D_s < 1.60 \cdot \bar{r}_s$$
$$0.50 \cdot f < D_s < 0.70 \cdot f$$
$$0.35 \cdot f < \bar{r}_s < 0.48 \cdot f$$
$$1.80 \cdot \bar{r}_z < D_s < 2.20 \cdot \bar{r}_z$$
$$0.80 \cdot \bar{r}_z < D_z < 1.10 \cdot \bar{r}_z$$
$$0.20 \cdot f < D_z < 0.30 \cdot f$$
$$0.25 \cdot f < \bar{r}_z < 0.35 \cdot f$$
$$1.30 \cdot r_5 < r_6 < 1.50 \cdot r_5$$
$$0.20 \cdot f < r_5 < 0.30 \cdot f$$
$$0.30 \cdot f < r_6 < 0.45 \cdot f$$
$$0.25 \cdot f < D_s - D_z < 0.40 \cdot f$$
$$0.75 \cdot f < L < 0.95 \cdot f$$
$$2.0 \cdot D_z < D_s < 2.5 \cdot D_z$$

wherein the symbols have the significance listed as follows:

$f=$ the focal length of the objective, $\bar{r}_s=$ the arithmetic means of the absolute amounts of the radius of the front surface of the second lens and the radius of the rear surface of the fifth lens, $D_s=$ the axial separation of these two surfaces, $\bar{r}_z=$ the arithmetic means of the absolute amounts of the radii of the surfaces $r_5$ and $r_6$ bordering upon the diaphragm $$\left(\bar{r}_z = \frac{r_5 + |r_6|}{2}\right)$$

$D_z=$ the length of the diaphragm space$=d_5$, $L=$ the overall length of the objective$=$the axial separation of the two external surfaces.

In practical performances the second lens may be cemented to the third lens and also the fourth lens to the fifth lens as the case may be.

Further it is an advantage in objectives according to the invention to select the $n$-value of the fourth lens greater than the arithmetical mean of the $n$-values of the two neighbouring lenses, particularly the $n$-value of the fourth lens may even be greater than the $n$-value of the third lens taken by itself.

Figure 2:
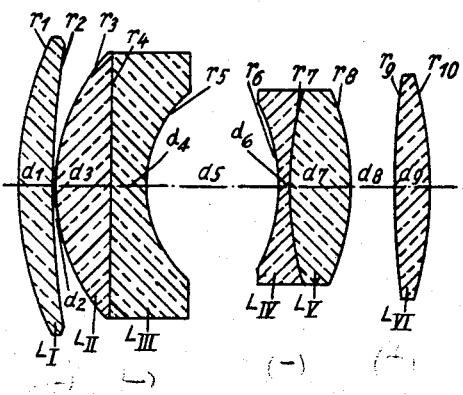
Figure 3:
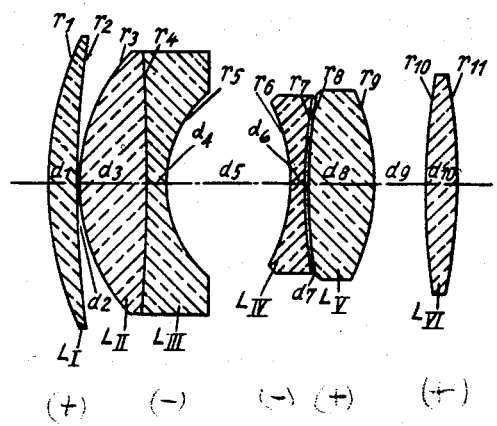
Figure 4:
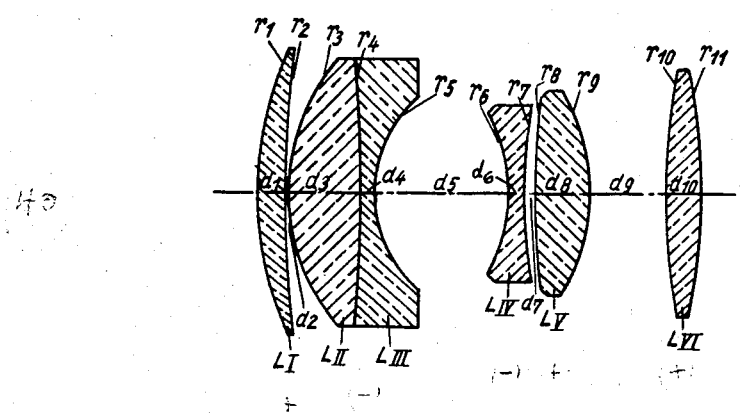

Four embodiments of objectives in which the characteristics according to the invention are fulfilled are represented in Figures 1 to 4 of the acompanying drawings. They correspond in their design to the numerical values given in the following tables wherein a focal length of $f=1$ has been made the basis for these numerical values. In the following tables there are designated By $L_I \ldots L_{VI}$ the lenses,
By $r_1 \ldots r_{11}$ the radii of the lens surfaces,
By $d_1 \ldots d_{10}$ the apical separations between the individual surfaces,
By $n_d$ the refractive indices,
By $v$ the Abbe numbers of the glasses.

Table 1

| Lenses | Radii | Axial Separations | $n_d$ | $v$ |
|---|---|---|---|---|
| $L_I$ | $r_1 = +0.66834$ | $d_1 = 0.010$ | 1.74796 | 44.9 |
|  | $r_2 = +1.53990$ | $d_2 = 0.001$ |  |  |
| $L_{II}$ | $r_3 = +0.39242$ | $d_3 = 0.160$ | 1.69368 | 55.1 |
|  | $r_4 = -3.54810$ | $d_4 = 0.0237$ | 1.65533 | 38.6 |
| $L_{III}$ | $r_5 = +0.24760$ | $d_5 = 0.262$ |  |  |
|  | $r_6 = -0.33982$ | $d_6 = 0.020$ | 1.76167 | 27.8 |
| $L_{IV}$ | $r_7 = +1.0000$ | $d_7 = 0.118$ | 1.70594 | 41.2 |
| $L_V$ | $r_8 = -0.45973$ | $d_8 = 0.009$ |  |  |
| $L_{VI}$ | $r_9 = +1.5399$ | $d_9 = 0.220$ | 1.74796 | 44.9 |
|  | $r_{10} = -0.81752$ |  |  |  |

Table 2

| Lenses | Radii | Axial Separations | $n_d$ | $v$ |
|---|---|---|---|---|
| $L_I$ | $r_1 = +0.69783$ | $d_1 = 0.070$ | 1.74796 | 44.9 |
|  | $r_2 = +1.7529$ | $d_2 = 0.001$ |  |  |
| $L_{II}$ | $r_3 = +0.39242$ | $d_3 = 0.1135$ | 1.69368 | 55.1 |
| $L_{III}$ | $r_4 = \infty$ | $d_4 = 0.070$ | 1.65533 | 38.6 |
|  | $r_5 = +0.24760$ | $d_5 = 0.2650$ |  |  |
|  | $r_6 = -0.34974$ | $d_6 = 0.020$ | 1.76167 | 27.8 |
| $L_{IV}$ | $r_7 = +0.70795$ | $d_7 = 0.120$ | 1.70594 | 41.2 |
| $L_V$ | $r_8 = -0.47315$ | $d_8 = 0.0880$ |  |  |
| $L_{VI}$ | $r_9 = +1.60790$ | $d_9 = 0.070$ | 1.74796 | 44.9 |
|  | $r_{10} = -0.81752$ |  |  |  |

Table 3

| Lenses | Radii | Axial Separations | $n_d$ | $v$ |
|---|---|---|---|---|
| $L_I$ | $r_1 = +0.66834$ | $d_1 = 0.0550$ | 1.69368 | 55.1 |
|  | $r_2 = +2.0242$ | $d_2 = 0.001$ |  |  |
| $L_{II}$ | $r_3 = +0.37584$ | $d_3 = 0.140$ | 1.62287 | 60.5 |
| $L_{III}$ | $r_4 = -3.5481$ | $d_4 = 0.036$ | 1.56432 | 45.5 |
|  | $r_5 = +0.23885$ | $d_5 = 0.250$ |  |  |
|  | $r_6 = -0.33256$ | $d_6 = 0.032$ | 1.76861 | 26.8 |
| $L_{IV}$ | $r_7 = +1.1220$ | $d_7 = 0.003$ |  |  |
|  | $r_8 = +1.1060$ | $d_8 = 0.133$ | 1.67133 | 42.1 |
| $L_V$ | $r_9 = -0.42781$ | $d_9 = 0.103$ |  |  |
| $L_{VI}$ | $r_{10} = +1.3924$ | $d_{10} = 0.060$ | 1.74796 | 44.9 |
|  | $r_{11} = -1.1060$ |  |  |  |

Table 4

| Lenses | Radii | Axial Separations | $n_d$ | $v$ |
|---|---|---|---|---|
| $L_I$ | $r_1 = +0.67803$ | $d_1 = 0.055$ | 1.69655 | 53.7 |
|  | $r_2 = +2.3375$ | $d_2 = 0.001$ |  |  |
| $L_{II}$ | $r_3 = +0.39811$ | $d_3 = 0.148$ | 1.62554 | 58.1 |
| $L_{III}$ | $r_4 = -3.0287$ | $d_4 = 0.028$ | 1.56432 | 45.3 |
|  | $r_5 = +0.25300$ | $d_5 = 0.266$ |  |  |
| $L_{IV}$ | $r_6 = -0.32081$ | $d_6 = 0.030$ | 1.76167 | 27.8 |
|  | $r_7 = +1.0000$ | $d_7 = 0.020$ |  |  |
| $L_V$ | $r_8 = +1.2772$ | $d_8 = 0.110$ | 1.66999 | 48.4 |
|  | $r_9 = -0.38961$ | $d_9 = 0.150$ |  |  |
| $L_{VI}$ | $r_{10} = +1.3335$ | $d_{10} = 0.070$ | 1.74796 | 44.9 |
|  | $r_{11} = -1.1715$ |  |  |  |

We claim:

1. A photographic objective for taking or projection containing six lenses of which the first and the second are collective lenses, the third and the fourth are dispersive lenses and the fifth and the sixth are collective lenses wherein all surfaces whose radii of curvature are numerically smaller than 90% of the focal length turn their concave side towards the air space found between the third and the fourth lenses characterized in that the following conditions are simultaneously fulfilled:

$$1.25 \cdot \bar{r}_s < D_s < 1.60 \cdot \bar{r}_s$$
$$0.50 \cdot f < D_s < 0.70 \cdot f$$
$$0.35 \cdot f < \bar{r}_s < 0.48 \cdot f$$
$$1.80 \cdot \bar{r}_z < D_s < 2.20 \cdot \bar{r}_z$$
$$0.80 \cdot \bar{r}_z < D_z < 1.10 \cdot \bar{r}_z$$
$$0.20 \cdot f < D_z < 0.30 \cdot f$$
$$0.25 \cdot f < \bar{r}_z < 0.35 \cdot f$$
$$1.30 \cdot r_5 < r_6 < 1.50 \cdot r_5$$
$$0.20 \cdot f < r_5 < 0.30 \cdot f$$
$$0.30 \cdot f < r_6 < 0.45 \cdot f$$
$$0.25 \cdot f < D_s - D_z < 0.40 \cdot f$$
$$0.75 \cdot f < L < 0.95 \cdot f$$
$$2.0 \cdot D_z < D_s < 2.5 \cdot D_z$$

the symbols having the significance as follows:

$f$ = the focal length of the objective,
$\bar{r}_s$ = the arithmetic mean of the absolute amounts of the radius of the front surface of the second lens and the radius of the rear surface of the fifth lens,
$D_s$ = the axial separation of these two surfaces,
$\bar{r}_z$ = the arithmetic mean of the absolute amounts of the radii of the surfaces $r_5$ and $r_6$ bordering upon the diaphragm space $$\left(\bar{r}_z = \frac{r_5 + |r_6|}{2}\right)$$

$D_z$ = the length of the diaphragm space = $d_5$,
$L$ = the overall length of the objective = the axial separation of the two external surfaces.

2. An objective according to claim 1 characterized in that the second lens is cemented to the third.

3. An objective according to claim 1 characterized in that the fourth lens is cemented to the fifth.

4. An objective according to claim 1 characterized in that the $n$-value of the fourth lens is greater than the arithmetical mean of the $n$-values of the two neighbouring lenses, i.e.

$$n_{IV} > \frac{n_{III} + n_V}{2}$$

5. An objective according to claim 1 characterized in that the $n$-value of the fourth lens is greater than the $n$-value of the third lens.

6. An objective according to claim 1, characterized in that the individual refractive powers of the surfaces ($\Delta n/r$) differ by a maximum of $\pm 0.5/f$ each and the apical separations of the individual surfaces ($d$) differ by a maximum of $\pm 0.05 \cdot f$ each from the numerical values taken from the following table:

| Lenses | Radii | Apical Separations | $n_d$ | $v$ | $\Delta n/r$ |
|---|---|---|---|---|---|
| $L_I$ | $r_1 = +0.66834 \cdot f$ | $d_1 = 0.010 \cdot f$ | 1.74796 | 44.9 | $+1.119130/f$ |
|  | $r_2 = +1.53990 \cdot f$ | $d_2 = 0.001 \cdot f$ |  |  | $-0.485720/f$ |
| $L_{II}$ | $r_3 = +0.39242 \cdot f$ | $d_3 = 0.160 \cdot f$ | 1.69368 | 55.1 | $+1.767697/f$ |
| $L_{III}$ | $r_4 = -3.54810 \cdot f$ | $d_4 = 0.0237 \cdot f$ | 1.65533 | 38.6 | $+0.010809/f$ |
|  | $r_5 = +0.24760 \cdot f$ | $d_5 = 0.262 \cdot f$ |  |  | $-2.646728/f$ |
|  | $r_6 = -0.33982 \cdot f$ |  |  |  | $-2.241392/f$ |
| $L_{IV}$ | $r_7 = +1.0000 \cdot f$ | $d_6 = 0.020 \cdot f$ | 1.76167 | 27.8 | $-0.055730/f$ |
| $L_V$ | $r_8 = -0.45973 \cdot f$ | $d_7 = 0.118 \cdot f$ | 1.70594 | 41.2 | $+1.535553/f$ |
|  | $r_9 = +1.5399 \cdot f$ | $d_8 = 0.009 \cdot f$ |  |  | $+0.485720/f$ |
| $L_{VI}$ | $r_{10} = -0.81752 \cdot f$ | $d_9 = 0.220 \cdot f$ | 1.74796 | 44.9 | $+0.914913/f$ | wherein:

$L_I \ldots L_{VI}$ are the lenses
$r_1 \ldots r_{10}$ are the radii
$d_1 \ldots d_9$ are the lens thicknesses of and the air spaces between the lenses,
$n_d$ are the refractive indices,
$v$ are the Abbe numbers, and
$f$ is the focal length of the objective.

7. An objective according to claim 1, characterized in that the individual refractive powers of the surfaces ($\Delta n/r$) differ by a maximum of $\pm 0.5/f$ each and the apical separations of the individual surfaces ($d$) differ by a maximum of $\pm 0.05 \cdot f$ each from the numerical values taken from the following table:

| Lenses | Radii | Apical Separations | $n_d$ | $v$ | $\Delta n/r$ |
|---|---|---|---|---|---|
| $L_I$ | $r_1 = +0.69783 \cdot f$ | $d_1 = 0.070 \cdot f$ | 1.74796 | 44.9 | $+1.071836/f$ |
|  | $r_2 = +1.7529 \cdot f$ | $d_2 = 0.001 \cdot f$ |  |  | $-0.426699/f$ |
| $L_{II}$ | $r_3 = +0.39242 \cdot f$ | $d_3 = 0.1135 \cdot f$ | 1.69368 | 55.1 | $+1.767697/f$ |
|  | $r_4 = \infty$ |  |  |  | $0.000000$ |
| $L_{III}$ | $r_5 = +0.24760 \cdot f$ | $d_4 = 0.070 \cdot f$ | 1.65533 | 38.6 | $-2.646728/f$ |
|  | $r_6 = -0.34974 \cdot f$ | $d_5 = 0.2650 \cdot f$ |  |  | $-2.177817/f$ |
| $L_{IV}$ | $r_7 = +0.70795 \cdot f$ | $d_6 = 0.020 \cdot f$ | 1.76167 | 27.8 | $-0.078720/f$ |
| $L_V$ | $r_8 = -0.47315 \cdot f$ | $d_7 = 0.120 \cdot f$ | 1.70594 | 41.2 | $+1.492000/f$ |
|  | $r_9 = +1.60790 \cdot f$ | $d_8 = 0.0880 \cdot f$ |  |  | $+0.465178/f$ |
| $L_{VI}$ | $r_{10} = -0.81752 \cdot f$ | $d_9 = 0.070 \cdot f$ | 1.74796 | 44.9 | $+0.914913/f$ | wherein:

$L_I \ldots L_{VI}$ are the lenses
$r_1 \ldots r_{10}$ are the radii
$d_1 \ldots d_9$ are the lens thicknesses of and the air spaces between the lenses,
$n_d$ are the refractive indices,
$v$ are the Abbe numbers, and
$f$ is the focal length of the objective.

8. An objective according to claim 1, characterized in that the individual refractive powers of the surfaces $(\Delta n/r)$ differ by a maximum of $\pm 0.5/f$ each and the apical separations of the individual surfaces $(d)$ differ by a maximum of $\pm 0.05 \cdot f$ each from the numerical values taken from the following table:

| Lenses | Radii | Apical Separations | $n_d$ | $v$ | $\Delta n/r$ |
|---|---|---|---|---|---|
| $L_I$ | $r_1=+0.66834 \cdot f$ | $d_1=0.0550 \cdot f$ | 1.69368 | 55.1 | $+1.037914/f$ |
|  | $r_2=+2.0242 \cdot f$ | $d_2=0.001 \cdot f$ |  |  | $-0.342693/f$ |
| $L_{II}$ | $r_3=+0.37584 \cdot f$ | $d_3=0.140 \cdot f$ | 1.62287 | 60.5 | $+1.657274/f$ |
| $L_{III}$ | $r_4=-3.5481 \cdot f$ | $d_4=0.036 \cdot f$ | 1.56432 | 45.5 | $+0.016502/f$ |
|  | $r_5=+0.23885 \cdot f$ | $d_5=0.250 \cdot f$ |  |  | $-2.362654/f$ |
| $L_{IV}$ | $r_6=-0.33256 \cdot f$ | $d_6=0.032 \cdot f$ | 1.76861 | 26.8 | $-2.311191/f$ |
|  | $r_7=+1.1220 \cdot f$ | $d_7=0.003 \cdot f$ |  |  | $-0.685036/f$ |
| $L_V$ | $r_8=+1.1060 \cdot f$ | $d_8=0.133 \cdot f$ | 1.67133 | 42.1 | $+0.606989/f$ |
|  | $r_9=-0.42781 \cdot f$ | $d_9=0.103 \cdot f$ |  |  | $+1.569224/f$ |
| $L_{VI}$ | $r_{10}=+1.3924 \cdot f$ | $d_{10}=0.060 \cdot f$ | 1.74796 | 44.9 | $+0.537173/f$ |
|  | $r_{11}=-1.1060 \cdot f$ |  |  |  | $+0.676275/f$ | wherein:

$L_I \ldots L_{VI}$ are the lenses,
$r_1 \ldots r_{11}$ are the radii,
$d_1 \ldots d_{10}$ are the lens thicknesses of and the air spaces between the lenses,
$n_d$ are the refractive indices,
$v$ are the Abbe numbers, and
$f$ is the focal length of the objective.

9. An objective according to claim 1, characterized in that the individual refractive powers of the surfaces $(\Delta n/r)$ differ by a maximum of $\pm 0.5/f$ each and the apical separations of the individual surfaces $(d)$ differ by a maximum of $\pm 0.05 \cdot f$ each from the numerical values taken from the following table:

| Lenses | Radii | Apical Separations | $n_d$ | $v$ | $\Delta n/r$ |
|---|---|---|---|---|---|
| $L_I$ | $r_1=+0.67803 \cdot f$ | $d_1=0.055 \cdot f$ | 1.69655 | 53.7 | $+1.027314/f$ |
|  | $r_2=+2.3375 \cdot f$ | $d_2=0.001 \cdot f$ |  |  | $-0.297989/f$ |
| $L_{II}$ | $r_3=+0.39811 \cdot f$ | $d_3=0.148 \cdot f$ | 1.62554 | 58.1 | $+1.571274/f$ |
| $L_{III}$ | $r_4=-3.0287 \cdot f$ | $d_4=0.028 \cdot f$ | 1.56432 | 45.3 | $+0.020213/f$ |
|  | $r_5=+0.25300 \cdot f$ | $d_5=0.266 \cdot f$ |  |  | $-2.230513/f$ |
| $L_{IV}$ | $r_6=-0.32081 \cdot f$ | $d_6=0.030 \cdot f$ | 1.76167 | 27.8 | $-2.374209/f$ |
|  | $r_7=+1.0000 \cdot f$ | $d_7=0.020 \cdot f$ |  |  | $-0.761670/f$ |
| $L_V$ | $r_8=+1.2772 \cdot f$ | $d_8=0.110 \cdot f$ | 1.66999 | 48.4 | $+0.524577/f$ |
|  | $r_9=-0.38961 \cdot f$ | $d_9=0.150 \cdot f$ |  |  | $+1.719642/f$ |
| $L_{VI}$ | $r_{10}=+1.3335 \cdot f$ | $d_{10}=0.070 \cdot f$ | 1.74796 | 44.9 | $+0.560899/f$ |
|  | $r_{11}=-1.1715 \cdot f$ |  |  |  | $+0.638464/f$ | wherein:

$L_I \ldots L_{VI}$ are the lenses,
$r_1 \ldots r_{11}$ are the radii,
$d_1 \ldots d_{10}$ are the lens thicknesses of and the air spaces between the lenses,
$n_d$ are the refractive indices,
$v$ are the Abbe numbers, and
$f$ is the focal length of the objective.

References Cited in the file of this patent

UNITED STATES PATENTS

| | | |
|---|---|---|
| 1,789,916 | Merte | Dec. 30, 1930 |
| 2,117,252 | Lee | May 10, 1938 |
| 2,349,893 | Warmisham et al. | May 30, 1944 |
| 2,532,751 | Baker | Dec. 5, 1950 |
| 2,532,752 | Baker | Dec. 5, 1950 |
| 2,735,340 | Aklin | Feb. 21, 1956 |

FOREIGN PATENTS

| | | |
|---|---|---|
| 427,008 | Great Britain | Apr. 12, 1935 |